United States Patent [19]

Richardson

[11] 3,885,630

[45] May 27, 1975

[54] BUFFER-REGULATED CARBONATE ACIDIZATION

[75] Inventor: Edwin A. Richardson, Houston, Tex.

[73] Assignee: Shell Oil Company, Houston, Tex.

[22] Filed: Jan. 24, 1974

[21] Appl. No.: 436,289

[52] U.S. Cl.............................. 166/307; 252/8.55 C
[51] Int. Cl............................................ E21b 43/27
[58] Field of Search ........... 166/307, 271, 259, 282, 166/300; 252/8.55 C

[56] References Cited
UNITED STATES PATENTS

| 2,640,810 | 6/1953 | Cardwell et al................. 166/307 X |
| 3,142,335 | 7/1964 | Dill et al............................. 166/307 |
| 3,441,085 | 4/1969 | Gidley............................. 166/307 |
| 3,768,564 | 10/1973 | Knox et al. ......................... 166/307 |

Primary Examiner—Stephen J. Novosad

[57] ABSTRACT

The rate of acidizing a material such as a carbonate reservoir is reduced by treating it with an aqueous solution that contains enough weak acid to react with a significant amount of the material and enough weak acid salt to provide a weak acid to weak salt ratio that maintains the concentration of ionized weak acid at a relatively low level at which its rate of reaction is relatively low.

8 Claims, 1 Drawing Figure

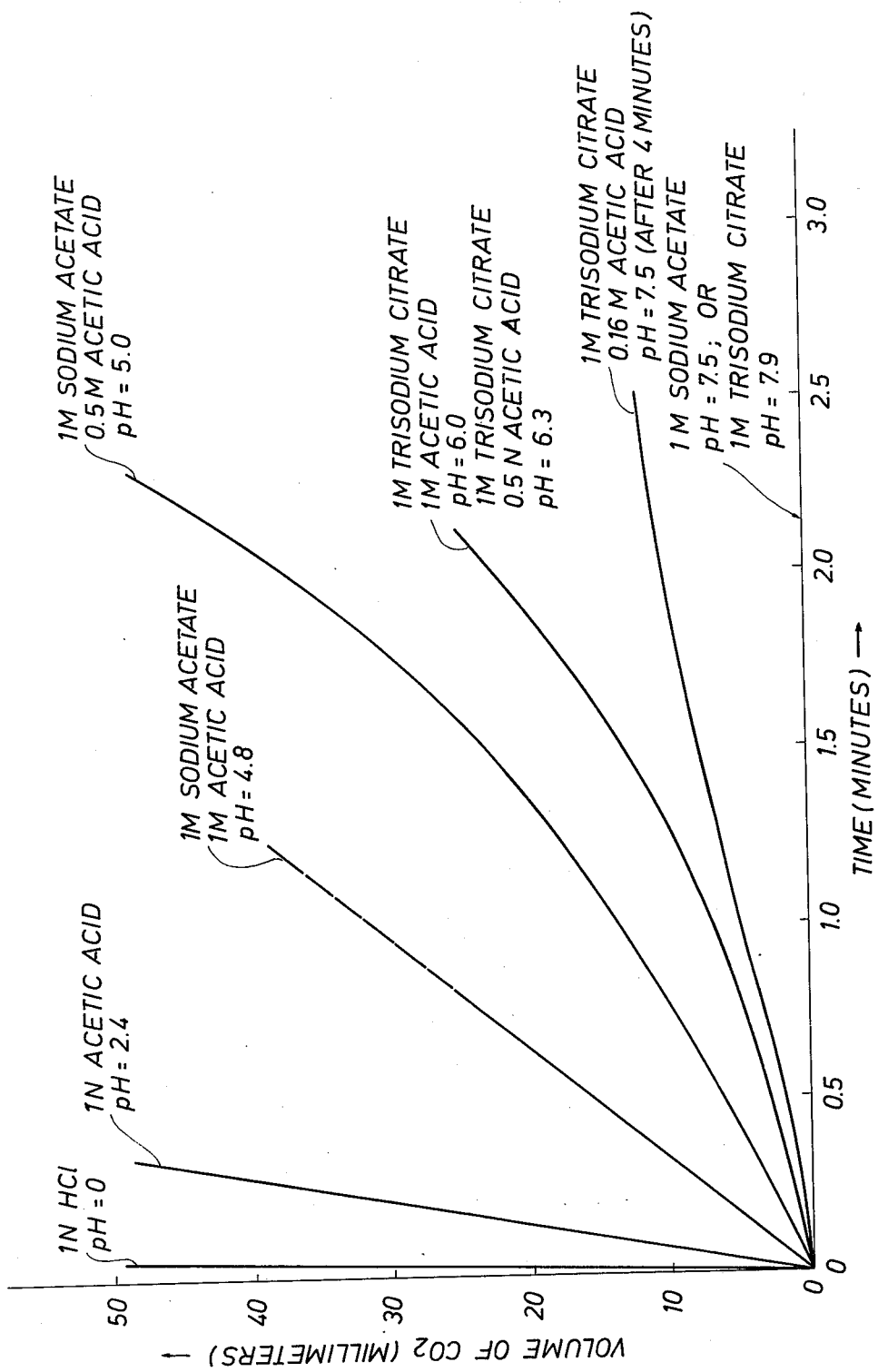

BUFFER-REGULATED CARBONATE ACIDIZATION

BACKGROUND OF THE INVENTION

The invention relates to acidizing an acid-reactive material, such as a carbonate mineral or a deposit in or around the bore hole of a well, to dissolve or chemically alter the acid-reactive material. The invention is particularly useful in matrix and/or fracture acidizations of subterranean carbonate reservoirs, particularly those in which the temperatures are relatively high.

Numerous methods have been previously proposed for reducing the rate at which an acid is spent in acidizing a rapidly reactive material such as a carbonate reservoir. The prior procedures have included dissolving or emulsifying an acid (or acid-forming material) in a non-aqueous liquid; forming an acid within a subterranean reservoir by a relatively slow hydrolysis of an organic halide or ester; dissolving enough water thickener in an aqueous acid to reduce the rate at which the acid diffuses into contact with the reactive material; or the like procedures. Various disadvantages are associated with each of such procedures.

SUMMARY OF THE INVENTION

In accordance with the present invention, an acid-reactive material is acidized at a relatively low rate by contacting it with an aqueous solution containing enough water-soluble weak acid to react with a significant amount of acid-reactive material and enough water-soluble weak acid salt to provide a ratio of weak acid to weak acid salt that limits the concentration of ionized weak acid to a relatively low level at which rate of the acidizing reaction is relatively low.

DESCRIPTION OF THE DRAWING

The drawing is a schematic illustration of a plot of amounts of carbon dioxide released with time while contacting calcium carbonate with the specified solutions.

DESCRIPTION OF THE INVENTION

The present invention is, at least in part, based on the following. When the concentration of ionized weak acid in an aqueous solution is relatively low, the rate at which the solution reacts with acid-reactive material is relatively low. The concentration of ionized weak acid in an aqueous solution can be established and regulated at a selected relatively low level by including in the solution an amount of dissolved weak acid salt that provides a selected ratio of weak acid (unionized as well as ionized) to weak acid salt. The concentration of the ionized weak acid is related to the pH of the solution and is buffered at a pH exceeding that of a solution containing the same amount of weak acid in the absence of the weak acid salt.

In such a buffered solution, when the available amount of weak acid (ionized and unionized) in a given portion of the solution is sufficient to react with a selected amount of acid-reactive material and the ratio of weak acid to weak acid salt is sufficient to provide a relatively low concentration of the ionized weak acid (at which the rate of reaction is relatively low), the concentration of the ionized weak acid is regulated by the buffering action and a relatively low rate of reaction is maintained throughout the reaction. As the concentration of ionized weak acid is lowered by the reaction, more unionized weak acid is ionized, and more weak acid anions (from the dissolved weak acid salt) are converted to unionized weak acid. The equilibrium set by the ratio of weak acid to weak acid salt remains substantially constant until most of one or more of those components have been depleted. As known to those skilled in the art, such a buffering action is effective over a relatively wide range of concentrations and, for example, the pH can remain substantially constant for a significant time and then rise after the buffering components are substantially depleted.

Weak acids suitable for use in the present invention comprise those which dissolve in water to form aqueous acids adapted to react with acid-reactive materials (such as carbonate minerals) at rates which decrease with decreases in the concentrations of the ionized acid. Examples of suitable weak acids include water-soluble fatty acids such as formic, acetic, propionic, and the like; substituted water-soluble organic acids such as chloroacetic acid, hydroxyacetic acid and the like; and various water-soluble polycarboxylic acids such as citric acid, and the like. Such acids can be used individually or in mixtures. Particularly preferred acids are formic, acetic, and citric acid.

Weak acid salts suitable for use in the invention comprise water-soluble salts of weak acids of the type described above. Examples of suitable salts include the ammonium or alkali metal salts of such acids. Such salts can be used individually or in mixtures. And, the salt of one weak acid can be used in conjunction with one or more different weak acids. For example, a small proportion of a weak acid salt that establishes a relatively high pH with a particular weak acid can be used along with another weak acid salt so that the pH is initially kept higher than the value that is later maintained. Particularly preferred weak acid salts include sodium acetate, sodium formate, and sodium citrate.

Aqueous liquids suitable for use in the invention comprise water or substantially any relatively dilute aqueous solution of materials that are compatible with weak acids, weak acid salts, and the acidification reaction products of reactions between weak acids and acid-reactive materials. Such liquids can advantageously contain additives such as corrosion inhibitors, wetting agents, detergents, oil solvents, or oil and water mutual solvents, thickening agents, suspensions of fracture-packing particles and the like such as those that are conventionally utilized in acidizing and/or fracturing fluids, etc. Particularly preferred aqueous liquids comprise water or relatively dilute and soft saline solutions.

The concentration of the weak acid and weak acid salt can be varied relatively widely depending on the particular acidizing treatment being conducted. In the present solutions, the acidifying agent comprises a selectively-proportioned mixture of weak acid and weak acid salt. The ratio is the main factor that establishes and regulates the pH, or ionized weak acid concentration, of the solution. The concentration of the weak acid (and thus, for a given ratio, the concentration of the mixture of weak acid and weak acid salt) is the main factor that establishes how much acid-reactive material will be acidized by a given amount of the solution. Thus, the proportionality or ratio (and the resulting buffering action) regulates the rate of the reaction, while the concentration controls the extent of the reaction. Suitable concentrations of weak acid can range from about 0.1 to 10 moles per liter of solution. Suitable ratios of weak acid to weak acid salt comprise ratios of from about 0.1 to 10.0.

In general, where it is desirable to dissolve or chemically convert a relatively large amount of acid-reactive material, it is preferable to use a solution containing only about the preferred concentration of weak acid and to flow enough portions of the solution into contact with the acid-reactive material to acidize all that is desired.

A significant practical advantage of the present buffer-regulated acidizing solutions is their relative stability and insensitivity to temperature - as long as they are kept out of contact with an acid-reactive material. Numerous ways and means for doing this are readily available.

Where it is desirable to provide an initially rapid and/or extensive acidization of an acid-reactive material, a strong acid can be dissolved in the present acidizing solution. This overrides the buffering action and depresses the pH of the solution. During an acidization, as soon as the rapidly-reactive strong acid has been depleted, the pH rises and the rate of acidization decreases and is maintained at the relatively low value at which it is regulated by the buffering action. Alternatively, where it is desired to provide a spent acid solution that attains a high pH, or even become alkaline, a strong base can be dissolved in the present acidizing solution. With such a base in the solution, the ratio of weak acid to weak acid salt must be high relative to that needed to maintain a selected pH in the absence of the base. During an acidization, after the weak acid has been significantly depleted and the buffering effect has been terminated, the pH rises to that established by the amount of base in the solution.

In compounding the present acidizing solutions, the reactants can be mixed in substantially any order and/or formed in-situ. For example, in preparing an acetic acid-sodium acetate solution, 0.853 ppg (pounds per gallon) acetic anhydride and 0.335 ppg sodium hydroxide can be dissolved in water. This forms a solution in which the ratio of weak acid to weak acid salt is about 1, the pH is about 4.8, and the rate of reaction with a carbonate mineral is about 10 times less than that of an aqueous solution containing the same amount of acetic acid in the absence of the sodium acetate.

Comparative Acidization Tests

The drawing illustrates a plot of data from comparative tests of contacting 1 gram samples of calcium carbonate with 10 milliliters (mls) of the specified aqueous solutions. Measurements were made of the number of mls of carbon dioxide that were released after various periods of minutes. The indicated pH values of the reacting solutions were measured at various times during the reactions. As indicated by the drawing, the reaction rates of the solutions containing mixtures of weak acids and weak acid salts are significantly lower than those of the acids free of the salts. And, the solutions of mixtures of weak acids and weak acid salts have reaction rates that are regulated and kept at substantially constant values by the buffering actions of the mixtures.

Exemplified Reservoir Matrix Acidization

The invention can be used to treat a carbonate reservoir such as one having a thickness of about 50 feet, a permeability of from about 1 to 100 millidarcies, and a temperature of about 150°F. The following typifies a preferred procedure for such a well treating process.

From about 5,000 to 50,000 gallons of a buffer-regulated acid is prepared in containers suitable for handling a weak acid. The indicated volume provides about 100 to 1,000 gallons of the acid per foot of vertical interval of the reservoir. The amount employed should be selected in accordance with the depth of penetration desired. The acid comprises an aqueous solution that contains about 1 mole per liter of each of acetic acid and sodium acetate along with corrosion inhibitors, wetting agents, and the like.

The buffer regulated acid is pumped through the well conduits and into the reservoir at a rate of from about 0.5 to 1.5 barrel per minute. The trailing edge is displaced by pumping in a substantially inert fluid such as salt water, diesel oil, or crude oil. The displacing fluid volume is metered to avoid over-displacing the acid. It is desirable to leave acid within the well throughout the perforated interval of the well casing.

The well is then shut in for about 12 hours and subsequently produced. Where the reservoir is relatively inhomogeneous, and it is desired to force a significant portion of the acid into the less permeable portions, diverting agents such as ball sealers, temperature or oil removable polymeric solids, or the like. The use of a somewhat water soluble solid acid such as benzoic acid, may be suitable, with appropriate adjustment of the ratio of weak acid to weak acid salt to account for the acid dissolved from the diverting agent.

Exemplified Acid Fracturing Process

The invention can be used to concurrently fracture and acidize a relatively tight carbonate reservoir, such as one having a permeability of a relatively few millidarcies.

A fracture-initiating portion of a "pad" of relatively viscous liquid, is first injected to form and extend a fracture. The pad is preferably at least about 10,000 gallons of a gelled aqueous fluid, having a viscosity of at least 10 centipoise. It is injected at a pressure at least exceeding the fracturing pressure of the reservoir at a rate of at least about 5–10 bbls. per minute. The initial portions of the pad are preferably kept free of solids, but in various situations, fracture-packing grains can advantageously be suspended in the latter portions of such a pad.

The pad is preferably followed by at least about 20,000 gallons of a buffer-regulated acid that is pumped into the fracture at substantially the same rate. This acid is preferably compounded by dissolving about 1 mole per liter of acetic acid and 1 mole per liter of trisodium citrate in an aqueous solution containing wetting agents and corrosion inhibitors that are compatible with acetic acid.

The buffer-regulated acid is displaced into the fracture by pumping salt water into the well conduits behind its trailing edge. The acid-displacing is preferably terminated with at least some acid remaining within the well throughout the perforated interval of casing, and the well is left shut-in for about 12 hours. Suitable fracture-propping agents, fluid loss additives, corrosion inhibitors, gelling agents, and the like, are currently available. A water soluble cellulose ether, such as hydroxyethylcellulose, can advantageously be used as the thickening agent, and can be used in the fracture-forming pad, the suspension of fracturing-propping grains and, if desired, in the buffer-regulated acid. The cellulose ether-thickening agents hydrolyze at a slow but significant rate, in the presence of aqueous acids, and thus form self-breaking viscosifiers that subsequently revert to relatively non-viscous fluids that are removed during the production of the well, to leave a high permeability throughout the fractured system.

I claim:

1. A well treating process comprising:
   flowing fluid into a well to contact an acid-reactive material in or around the borehole of the well; and
   including in the fluid an aqueous solution which, at the time it is flowed into the well, consists essentially of a solution of enough water-soluble weak acid to react with a significant amount of the acid-reactive material and enough water-soluble weak acid salt to provide a ratio of weak acid to weak acid salt that maintains the pH of the solution at a relatively high level and maintains the concentration of ionized weak acid in the solution at a relatively low level such that the rate of the reaction with the acid-reactive material is relatively low.

2. The process of claim 1 in which the fluid is flowed into a subterranean reservoir containing a carbonate mineral.

3. The process of claim 2 in which the fluid is flowed into the reservoir during the forming or treating of a fracture.

4. The process of claim 1 in which the concentration of the mixture of weak acid and weak acid salt in a given portion of the solution is less than enough to react with the desired amount of acid-reactive material and a plurality of portions of the solution are flowed into contact with the acid-reactive material to cause the desired amount to be reacted.

5. The process of claim 1 in which the weak acid and weak acid salt are, respectively, acetic acid and sodium acetate.

6. The process of claim 1 in which the weak acid and weak acid salt are, respectively, acetic acid and trisodium citrate.

7. The process of claim 1 in which the weak acid and weak acid salt are, respectively, formic acid and sodium formate.

8. A process for acidizing a remotely-located fluid-contactable acid-reactive material which process comprises:
   flowing fluid into contact with the material to be acidized; and
   including in that fluid an aqueous solution which, at the time it is flowed into the remote location, consists essentially of a solution of enough water-soluble weak acid to acidize a significant amount of the acid-reactive material and enough water-soluble weak acid salt to provide a ratio of weak acid to weak acid salt that maintains the pH of the solution at a relatively high level and maintains the concentration of ionized weak acid at a relatively low level such that the rate of acidization of the acid-reactive material is relatively low.

* * * * *

Disclaimer 3,885,630.—*Edwin A. Richardson*, Houston, Tex. BUFFER-REGULATED CARBONATE ACIDIZATION. Patent dated May 27, 1975. Disclaimer filed July 5, 1977, by the assignee, *Shell Oil Company*.

Hereby enters this disclaimer to all claims of said patent.

[*Official Gazette August 30, 1977.*]